(12) United States Patent
Drouin et al.

(10) Patent No.: US 8,754,954 B2
(45) Date of Patent: Jun. 17, 2014

(54) HIGH RESOLUTION HIGH CONTRAST EDGE PROJECTION

(75) Inventors: Marc-Antoine Drouin, Gatineau (CA); Francois Blais, Orleans (CA)

(73) Assignee: National Research Council of Canada, Ottawa, Ontario (CA)

( * ) Notice: Subject to any disclaimer, the term of this patent is extended or adjusted under 35 U.S.C. 154(b) by 555 days.

(21) Appl. No.: 13/108,378

(22) Filed: May 16, 2011

(65) Prior Publication Data

US 2012/0293700 A1 Nov. 22, 2012

(51) Int. Cl.
*H04N 5/228* (2006.01)

(52) U.S. Cl.
USPC .................................................... 348/222.1

(58) Field of Classification Search
USPC .................................................... 348/222.1
See application file for complete search history.

(56) References Cited

U.S. PATENT DOCUMENTS

| | | | |
|---|---|---|---|
| 5,852,672 A | 12/1998 | Lu | |
| 6,195,445 B1 | 2/2001 | Dubuisson-Jolly et al. | |
| 6,369,899 B1 | 4/2002 | Hamada | |
| 6,400,394 B1 * | 6/2002 | Kim et al. | 348/51 |
| 6,510,244 B2 * | 1/2003 | Proesmans et al. | 382/203 |
| 7,446,822 B2 | 11/2008 | Stern et al. | |
| 7,545,516 B2 | 6/2009 | Jia et al. | |
| 7,659,946 B2 | 2/2010 | Shirasaka et al. | |
| 2002/0057438 A1 | 5/2002 | Decker | |
| 2004/0119720 A1* | 6/2004 | Spangler | 345/583 |
| 2005/0041949 A1* | 2/2005 | Onuki et al. | 385/140 |
| 2007/0110294 A1 | 5/2007 | Schaap et al. | |
| 2009/0225333 A1 | 9/2009 | Bendall et al. | |
| 2009/0238449 A1 | 9/2009 | Zhang et al. | |
| 2010/0034429 A1 | 2/2010 | Drouin et al. | |
| 2010/0073461 A1 | 3/2010 | Hammes et al. | |

FOREIGN PATENT DOCUMENTS

EP 0943950 9/1999

OTHER PUBLICATIONS

English abstract of EP0943950; published Sep. 22, 1999; Applicant GF Messtechnik GMBH.
Written Opinion of the International Searching Authority PCT/CA2012/000204.
PCT International Search Report PCT/CA2012/000204.

* cited by examiner

*Primary Examiner* — James Hannett
(74) *Attorney, Agent, or Firm* — Jason Davis (57) ABSTRACT

Generating a high definition projected illumination pattern from a substantially lower resolution digital projector array involves: selectively illuminating a connected set of pixels to produce a pixellated, high contrast edge feature, and positioning an anisotropically blurring optical element (ABOE) between a light source of the projector array and the projection. The ABOE applies an anisotropic blur pattern to pixels of the at least one connected set, to locally preferentially blur the pixel more (and preferably substantially only) in a direction of equally or more strongly illuminated pixels, and not in directions of less illuminated pixels. Preferably a contour of the connected set has no beginning or end within a periphery of the illumination plane, and has bounded curvature, permitting simple ABOEs to be used. Several images each having several or many edges can be produced using a same ABOE. The ABOE may alleviate interpixel gap effects for non-edge pixels too.

20 Claims, 5 Drawing Sheets

HIGH RESOLUTION HIGH CONTRAST EDGE PROJECTION

FIELD OF THE INVENTION

The present invention relates in general to a technique for increasing a smoothness, resolution and uniformity of an edge in a projected high contrast image, using a lower resolution, pixellated, projector. The technique may be applied to spatially distribute light in a pattern with such edges, e.g. a pattern or texture for such applications as metrology, and structured light (fringe) projection systems.

BACKGROUND OF THE INVENTION

There are various systems that project patterns of light. Special purpose projectors are designed to generate a relatively small number of light patterns, but to provide a quality of illumination that is higher than general purpose projectors, which are designed to project any image. Such projectors may have application in structured light (fringe) projection systems, macroscopic photoresist exposure systems, or thermal pattern deposition systems for example, where the projection is applied to a surface, and the pattern defines a high contrast edge, which may be designed to be as abrupt as possible, or may have a prescribed, smoothly graduated, profile. While the pattern may be projected onto a surface, it could be used within an optical medium to selectively illuminate parts of the medium while keeping other parts dark. Various applications from structured light (fringe) projection systems, to depth-from-focus confocal microscopy illumination (e.g. see EP0943950) are suggested.

Various techniques are known for producing such patterns, including: analogue white light projectors; digital white light projectors; and laser tracing of the pattern.

The highest quality structured light (fringe) projection systems currently available are analogue white light projectors. US20090238449 teaches an optical grating component between light source and a projection lens. There are other patterning elements that could be used to generate lines of high intensity contrast. While such techniques can produce excellent quality patterns, the costs of such systems are relatively high, especially if a projector having small dimensions is desired. The flexibility of such systems is generally limited to the number and arrangements of the patterning elements. Thus where several patterns are desired, the complexity of the projector is increased. In some systems, it is desired to ensure precise positioning of the pattern with respect to a centre of the projection, which requires registration of the patterning element(s) with precision. When fast switching between the patterns is desired, this further increases a cost and expense of the system.

It is known to use lasers as coherent light sources having naturally high intensity contrast. For example, U.S. Pat. No. 7,446,822 teaches a high resolution pattern projection using a laser that produces an image that is in-focus over a large distance interval. Unfortunately the speed with which lasers can scan and the precision with which they are controlled limit the speed with which patterns can be formed and the faster the laser beam scans, the lower the energy applied, and therefore the lower the contrast. Furthermore, coherent light sources, such as most lasers, suffer from speckle which affects imaging.

It is known to use digital white light projectors. For example, U.S. Pat. No. 7,545,516 teaches a digital micro-mirror (DMD) based projector with a typical projector lens. A major advantage of this technology over analog and laser-based pattern forming is that there is no need to move a laser or patterning element into precise registration at a high rate. The micro-mirrors can be independently tilted to form arbitrary pixel maps, and these can be switched at a desired rate (see U.S. Pat. No. 6,369,899). Another advantage is the low cost of these systems. A disadvantage of the digital projector array technology, that almost completely nullifies the advantages for certain applications however, is its resolution (pixel density), which discretizes any projected image. Other image defects can also be a nuisance when imaged at a high resolution, such as a non-uniformity of illumination across a single pixel, although these defects are less significant Using this technology to generate a pattern to cover a small area will produce regular patterns, but it is generally desirable to produce larger, higher quality edge patterns, to improve coverage and resolution. Furthermore, for applications that involve selectively illuminating a surface or volume, commercially available digital cameras typically resolve pixels that are many times smaller than the display pixels of DMDs. Thus one could, in principle, use several DMD projectors to cover a FOV of a digital camera, to improve the utilization. Unfortunately this would require onerous alignment of the DMD projectors, and would make for an unwieldy system.

Typically interpixel gaps are removed by blurring (defocusing) the projector. This works, but at the expense of the sharpness of the edges (contrast), which results in an increase in the noise of the image. When camera pixel density/projector pixel density ratio is very high, the regular blurring needs to be so large that fine black and white edge features become ill defined gray patches before the interpixel gaps are smoothed out.

U.S. Pat. No. 7,659,946 teaches an anisotropic device in a liquid crystal projection device to delay the polarisation of light along one axis so that the polarization is aligned with the liquid crystal device, to improve its black & white contrast. Specifically, a tilted phase plate compensates for the wavelength dependence of the ellipticity of the polarized light passing through the liquid crystal layer in the black display state. This anisotropic device does not change a geometrical divergence or beam focus of the light as a function of angle (in a plane of projection).

There remains a need for a technique for improving defects like interpixel gaps, discretization, and low contrast, at edges in projected patterns, in order to generate smooth, continuous edges having desired profiles, from pixellated, lower resolution digital projectors, for special purpose pattern formation.

SUMMARY OF THE INVENTION

For those wanting to project a high definition high contrast edges on a screen, or object, or within a 3D volume, as is currently desired at least for various surface or volume illuminating techniques, and metrology (fringe projection systems are particularly noted), there is a need for a low cost solution, especially if multiple different patterns of illumination with different edges are desired. Analog systems known in the art require expensive equipment because of the stringent alignment/registration requirements of the moving parts.

Substantial reduction of interpixel gaps and discretization in illumination patterns that define edges (special purpose images) projected by a digital projector array without reducing contrast, can be obtained by introducing anisotropic blurring elements between a light source in the projector, and the projection. The anisotropic blurring elements are designed to blur pixels of illumination in one or more directions (which may depend on a position within the projected plane), and not in others. Chiefly, blurring of illuminated pixels in the plane of illumination towards pixels of lower illumination is reduced, in comparison with directions of pixels having equal or higher illumination. Preferably substantially all blurring of a pixel is in a direction of pixels of equal illuminations, such as is provided if each pixel is blurred in a direction is oriented in a direction that is tangential to a contour of an illuminated region at each point. The blurring directions of each pixel in the plane of illumination define a blurring map. Alignment of the blurring map with respect to the projector, when the projector is suitably illuminated, results in alleviation of interpixel gap effects and discretization, at least along one or more edges, without impairing contrast. As long as the blurring is oriented in a direction that is tangential to a contour of an illuminated region at each point, blurring light to lower illumination pixel areas can be avoided.

Accordingly, a method is provided for projecting a special purpose image using a lower resolution digital projector array. The method comprises choosing a pattern to be illuminated, the pattern having at least one high contrast edge feature that extends continuously across a plane of the illumination; applying an illumination pattern on the projector array to define a pixellated, high contrast approximation to the edge feature; and providing an anisotropically blurring optical element between an illumination source and the projection that blurs each pixel of a connected set of pixels of the illumination pattern more in directions of pixels of equal or greater illumination, and less in directions of pixels of lower illumination.

Choosing the illumination pattern may comprise choosing a pattern wherein each edge feature extends without end within the illumination plane, either as a closed loop or as an edge that extends from one periphery of the illumination plane to another. Accordingly providing the anisotropically blurring optical element (ABOE) may comprise providing a blurring element for each edge feature, the ABOE may be independently movable, and if so providing the ABOE may further comprise moving each of the ABOEs and/or modifying the illuminated pixel pattern, to align respective ABOEs with the edge features. The plurality of ABOEs may be arranged in parallel. The ABOE may have a 1 dimensional pattern of anisotropic blurring directions to match the tangent when aligned with the first direction. The edge feature may be a straight line, or a curve, that extends without ending, or intersecting with any other edge feature, within the illumination plane. The edge feature may be straight line that is off axis of the projection array, or a curve, to provide a jagged, pixellated, high contrast approximation. If the edge feature is a curve, it may have a constant magnitude. The edge feature may have a continuous and uniform intensity profile in a normal direction perpendicular to the local tangent of the edge. The ABOE may blur pixels other than those at the edge. The edge feature has a bright side and a dark side, and providing the anisotropically blurring optical element may comprise: providing a ABOE that blurs the pixellated, high contrast, jagged approximation of the edge feature, and furthermore blurs a bright side of the pattern to remove interpixel gaps within the vicinity of the edge feature, while minimally decreasing contrast of the image. The edge feature may have a bright side that gradually and smoothly transitions to a dark side, and rotation of the image and the anisotropically blurring optical element with respect to the digital projector array may be used to vary an extent of the transition. Alternatively or additionally, a local degree of blurring of the ABOE may be used to vary an extent of the transition, with or without changing a local curvature of the edge feature.

Providing the ABOE may comprise anisotropically blurring each pixel of the connected set of pixels at substantially a same degree and at a fixed angle with respect to the projector array. The connected set of pixels may include a chain of pixels that extends without end within the plane of illumination. There may be multiple such connected sets of pixels, and they may be parallel, such as parallel lines. The ABOE may anisotropically blur in a direction tangential to the edge feature, and substantially not blur in a direction normal to the edge feature.

The ABOE may comprise: a cylindrical lens; a plurality of linear strips, each with a respective cylindrical lens; a Fresnel lens; a diffraction medium bearing a pattern; a reflective surface bearing a pattern; a hologram; or an interferometric pattern.

Also accordingly, a system is provided for projecting an image with a lower resolution projector array, the system comprising: a digital projector array adapted to selectively illuminate at least one connected set of pixels to produce a pixellated, high contrast edge feature; and an anisotropically blurring optical element positioned between a light source of the projector array and the projection, the anisotropically blurring optical element applying an anisotropic blur pattern to the at least one connected set of the pixels, to locally preferentially blur the pixels tangentially, along a contour of the connected set of pixels.

The digital projector array may be adapted to produce a number of different images, each image having a respective set of at least one connected set of pixels. The digital projector array may be adapted to selectively illuminate an image comprising multiple connected sets of pixels, each defining a respective edge feature. The digital projector array may be adapted to selectively illuminate any one of a set of images, each image comprising multiple connected sets of pixels, each connected set defining a respective edge feature. One ABOE with one anisotropic blur pattern may preferentially blurs the pixels tangentially, along each contour of each of the connected sets of pixels of each of the images.

The connected set of illuminated pixels may have no beginning or end within an illumination plane, but may have a beginning and/or an end at a periphery of the illumination plane. The blur pattern may have a degree of blurring for a given pixel in the blur pattern that is higher if neighbouring pixels of the contour are more distant, or if at the given pixel the contour is the straightest.

The ABOE may comprise: a cylindrical lens; a plurality of linear strips, each with a respective cylindrical lens; a Fresnel lens; a diffraction medium bearing a pattern; a reflective surface bearing a pattern; a hologram; or an interferometric pattern.

A kit is also provided, the kit comprising: an anisotropically blurring optical element suitable for applying an anisotropic blur pattern to an incident plane wave, the blur pattern preferentially blurring local elements such that blurring follows a substantially continuous, connected polyline; and instructions for: positioning the optical element between a light source of the projector array and a projection; and aligning the optical element with respect to the projector array, whereby one or more patterns of illumination from the digital projector array will emit a pixellated, high contrast edge feature that is anisotropically blurred by the optical element to project an image including a high contrast, high resolution edge feature.

The kit may further comprise one or more of: a digital camera for imaging the projected image; a software program for receiving a digital image of the projected image, and compute a surface topography of a surface on which the image was projected; a mounting for positioning the optical element; a software program for receiving a digital image of the projected image, and controlling an alignment of the optical element via a mounting; the digital projector array; a software program for receiving a digital image of the projected image, controlling a pattern of illumination of the digital projector array, and/or controlling an alignment of the optical element via a mounting; and a software program for receiving a digital image of the projected image on a surface, and matching camera pixel information with projection pixel illuminations. The ABOE may comprise: a cylindrical lens; a plurality of linear strips, each with a respective cylindrical lens; a Fresnel lens; a diffraction medium bearing a pattern; a reflective surface bearing a pattern; a hologram; or an interferometric pattern.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Applicant has developed a technique for reducing interpixel gaps and discretization in special purpose images projected by a digital projector array by introducing anisotropic blurring elements between the light source and the projection, without reducing contrast of the images. Special purpose image projection systems, unlike general image projection systems, are designed to project one of a predefined number of images, that is typically far fewer in number than a conventional video projector, which can project $n^m$ images for m pixels each having one of n colour values. While the logical limit on the number of special purpose images may be about $2^{r+c}$, where the array has r rows and c columns, in practice one to a few dozen images are used for most applications.

The anisotropic blurring elements are designed to blur pixels of illumination in one or more directions (which may depend on a position within the projected plane), and not in others. The anisotropic blurring elements produces a blurring map that, if aligned with the pixel illuminations, results in alleviation of interpixel gap effects and discretization, without impairing contrast. Aligning the image with the blurring map, the individual pixels are blurred in the direction(s) of adjacent pixels having a same (or greater) illumination, more so than in a direction of pixels having lower illuminations, and preferably substantially only blurring in one or more directions of adjacent pixels of equal illumination. As such, the desired illumination is spread sufficiently to remove interpixel gap effects at least over the edge pixels, but the focusing is selective and contrast is not substantially impaired.

As a requirement for continuity, each pixel from a connected set of pixels that define an edge (in a pixellated, low resolution manner) has a neighbouring pixel (or at least a subpixel region) having the same desired illumination, and having an equal intensity contour defining a profile of the edge. So, if the blurring is oriented in a direction that is tangential to a contour of an illuminated region at each point, this will be satisfied. Further blurring elements can be used to smooth out the interpixel gaps located in the middle of the imaged pattern, which may have equal illumination pixels in every direction, and therefore blurring can be provided in any or all directions. In some applications anisotropic blurring is provided at such middle pixels so that the same point on the blurring map can be used for edges of other illumination patterns.

Advantageously a simple and inexpensive cylindrical lens can effectively perform all of this if the edges of the image are all parallel lines, in such an embodiment only an angle of orientation needs to be considered for alignment, once the anisotropic blurring elements are within a plane of the projector. There are two general embodiments for producing high resolution, high contrast images, ones that require a most abrupt transition from illumination to darkness (herein a binary image), and ones that require a high contrast, uniform or controlled edge profile having a continuous and graduated change in luminance, such as a profile that matches a sine function (0°-90°). The binary image may be provided by illuminating columns or rows of pixels, and applying a blurring parallel to the rows or columns. This will provide high contrast images and remove interpixel gaps and discretizations along the direction of illumination, but will leave regions of lower intensity between successive rows or columns. If the illuminated rows or columns are a single pixel wide, this would be of no consequence, and such one-dimensional defects perpendicular to the edge may not be crucial for some applications.

If the defects between adjacent rows/columns are undesirable, rotating the blurring with respect to the pixels will decrease the inter-row/column defects, at a cost to the abruptness of the transition between the illuminated and dark columns (and the contrast). The penalty in contrast can be reduced by illuminating skew lines, instead of columns. It may perhaps be surprising at first blush, that by illuminating a jagged, stepped function instead of the relatively smooth column, contrast and uniformity of the line is improved.

The foregoing description presumes a digital projector array of conventional form, in which individual pixels are controlled substantially independently, where each pixel is of a same size and shape. However, a digital projector array having effective pixels of different sizes and shapes can equally be used as long as the sizes and shapes produce a pixellated pattern of illumination that is reproducibly controllable to the extent that a suitable blur pattern can be defined and encoded into an anisotropic blurring element for the pixellated pattern, and aligned to the projector array to correct for pixilation effects.

Figure 1:
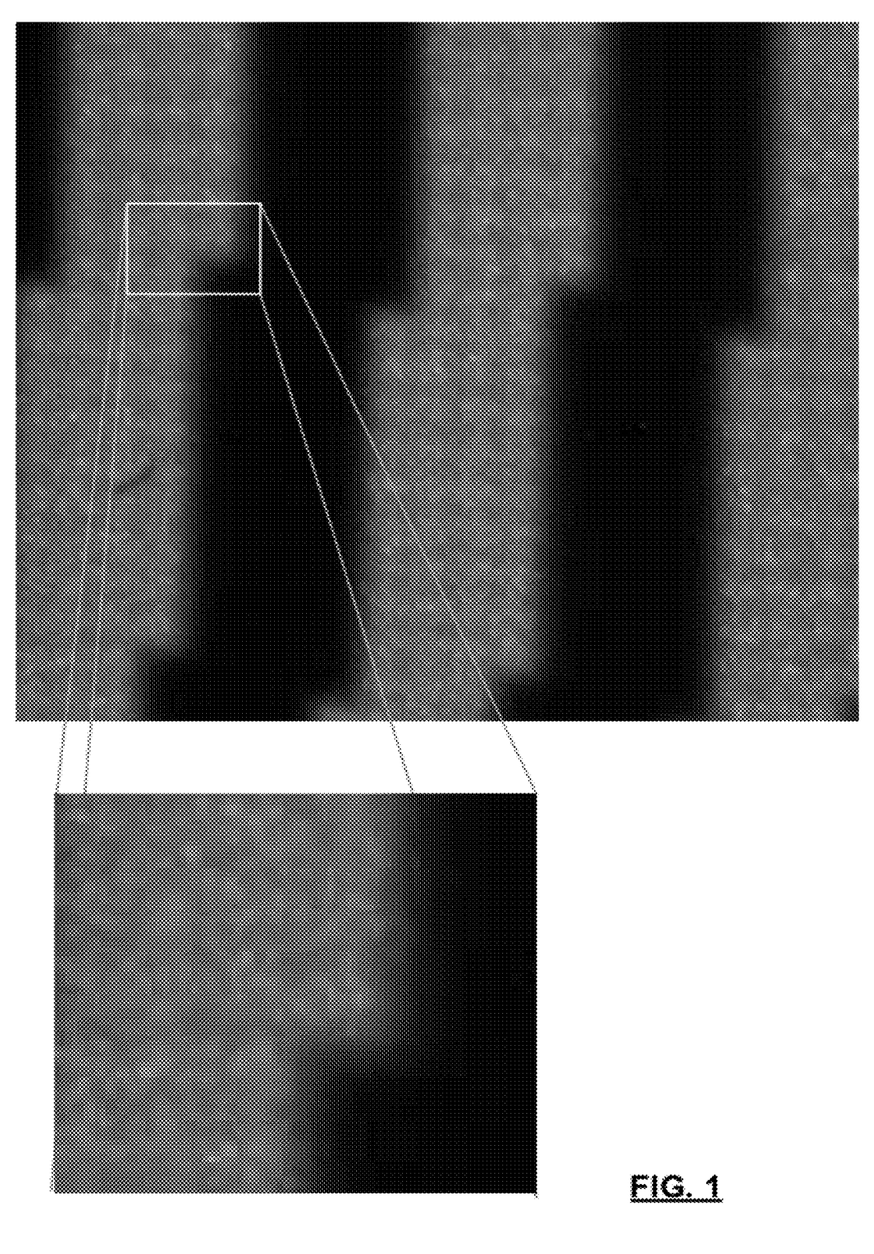
FIG. 1 are images of a state of the art digital projector array output showing pixellated jagged approximation of edges features, interpixel gaps as horizontal and vertical bands, and an enlargement of an edge.

FIG. 1 is an image of a projector showing the interpixel gaps, that is typical of high resolution images of projected lines: it is pixellated. In the illuminated regions a grid work of lower intensity regions are defined by interpixel gaps. The jagged pixels steps are shown too. While this image was taken using a Digital Micromirror Device (DMD)-based projection array, similar defects are provided using LED, OLED, and LCD technologies. This image illustrates the nature of technology today: we can easily get 18 or 21 MP digital camera, but affordable digital projector arrays have not increased at a similar rate (the projector is 2.8 MP).

Figure 2:
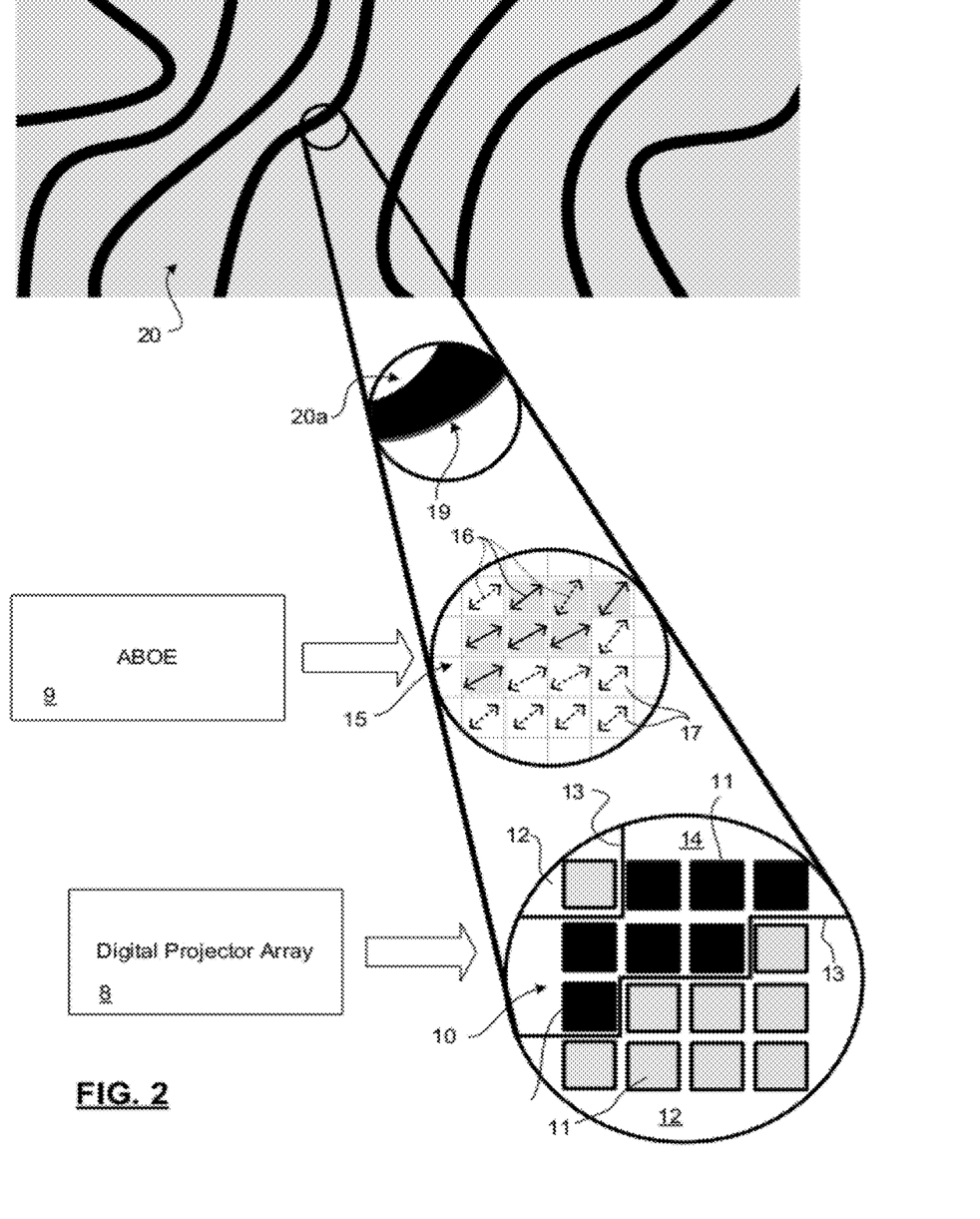
FIG. 2 is a schematic illustration of a pixellated high contrast image of a digital projection system, an anisotropic blurring pattern suited to the image, and a resulting high resolution, high contrast image.

FIG. 2 schematically illustrates: an enlarged portion of a pixellated high contrast (special purpose) image 10 from a (relatively) low resolution digital projector array 8; a corresponding portion of an anisotropic blurring map 15 from an anisotropic blurring optical element 9, the blurring map 15 suited to match the image 10; and a resulting high resolution, high contrast projected image 20 produced when the blurring map 15 is suitably aligned with the image 10. The projected image 20 may be projected onto a surface, or into a volume.

Image 10 is substantially what can be achieved with a digital projector array 8 according to the prior art, however it is known to defocus such an image, and use grayscaling and dithering to improve smoothness of the line, but the defocusing comes at the expense of contrast. The image 10 is pixelated (pixels 11) and has well defined light 12 and dark 14 regions with two high contrast edge features 13 between the two. The edge features 13 are pixellated approximations of the contours of the illuminated regions of the projected image 20. Illuminated pixels 11 are shown black and dark pixels 11 are shown gray.

The high contrast edge features 13 may be a line along one of the dimensions of the projector array 8 (row or column), in which case a linear edge is projected. Such a line, while not having jagged edges, will still have discrete boundaries between illuminated pixels that lead to grid work of lower intensities in a projected image that is undesirable for present applications. Alternatively, the edge 13 may be a line oriented obliquely to the axes of the projector array and the edges of the pixels, or curved (as shown), making the edge 13 jagged. While the edge 13 may be naturally divided into segments having different properties, intensity profiles, orientations, curvatures, etc., they are preferably continuous, at least within the plane of illumination (which may be defined by a frame through which the projector array emits).

Pixel illumination in a neighbourhood of the edge 13 may be halftone or grayscale (in illumination intensity, colour, or time), especially for pixels 11 that define the edge 13, and this grayscaling may be dithered or varied spatially. In this manner a collection of different edges 13 may be provided within a visual instant to provide a superimposed edge 13 that appears to have greater refinement, by crossing through the pixels 11. The grayscaling provides an important flexibility for subtly improving image quality and alignment, and permits a variation in how gradually or abruptly an illumination profile of the edge as projected 19 changes as a function of position.

The edge 13 may be non-linear. Preferably a curvature of the edge 13 is bounded by the limits of control over the blurring map, such that a controlled amount of illumination from illuminated pixels are blurred to less illuminated areas, to keep a limit on a loss of contrast. Thus if the dark regions 14 are convex sets, the light regions 12 can be blurred without precise orientation and arrangement, except along the boundary, and blurring can be performed in two opposite directions, as with cylindrical lenses.

At a periphery of the plane of illumination, as shown in the projected image 20, one or more edges 13 may end, as light lost by blurring in a tangent to the edge 13 at this point does not increase illumination of dark regions of the projected image 20.

The blurring map 15 may be provided by an interferometric pattern, a diffractive medium bearing a pattern, a reflective surface bearing a pattern, a refraction or a hologram. The pattern may include a lens, such as a cylindrical lens, or a Fresnel lens. Holograms, gratings, and interference patterns, while generally more expensive, may provide certain advantages in terms or finer control over blurring directions: for example, blurring edges that intersect may be difficult otherwise. For example, interferometric, or holographic patterns may be preferred if edge patterns have sharp corners, or end in a middle of the plane of illumination, and high contrast is desired at both edges of the corner, such as is the case with the square pattern of illumination described in EP0943950.

Where simpler optical setups are preferred, a plurality of thin refractive (or in some cases diffractive) ABOEs 9 that can be individually arranged, for example, one for each edge 13 of the image 10, or one for each light region 12. Such ABOEs 9 may be designed to be applied on a transparent film, or directly on a lens of the projector array. Such ABOEs 9 may be designed to tile the plane of illumination, or may be thin enough and/or tapered at edges to avoid diffraction effects. If an OLED or LED display is used, the ABOEs may be arranged in a grid in a plane overlying the diode array, such as a molded lens, or gradient index lens known in the art. The ABOEs 9 may be deformable.

Simpler still, the blurring map may be provided by a single ABOE 9 such as a film or prearranged set of ABOEs 9 having fixed positions, at the expense of being able to independently arrange the ABOEs 9. A simple arrangement of cylindrical lenses may be provided as a commercially available lenticular array. Also, commercially available Fresnel lenses may be used.

An exemplary blurring map 15 would be provided by a single ABOE having a continuous blurring map 15 that extends over the whole plane of illumination. The ABOE may be a cylindrical lens, which blurs substantially only in two directions. A slightly higher contrast image may be provided if only quarter cylinders are provided, as blurring would occur only in one direction. By orienting this direction towards a centre of the plane of illumination, less light will be blurred outside of the plane of illumination, and thus more light is retained in the image. As losses are incurred for each gap between parallel arranged ABOEs, there is some advantage to a single element. If the gaps between the ABOEs are spaced and arranged to coincide with interpixel gaps, this loss may be negligible. Alternatively a film consisting of an array of previously arranged diffractive or refractive elements may be used.

The blurring map 15 is shown with a blurring angle 16 for each pixel region 17. As drawn, grayed pixel regions correspond with illuminated pixels 11, and white pixel regions correspond with dark pixels 11. Naturally the blurring map 15 is preferably a continuous, smooth gradient vector field, but it is convenient to represent this as an average over the corresponding pixel region 17 of the plane of illumination (at the ABOE). Furthermore it is noted that a degree of the blurring at each point (or average over the pixel region 17) may be modulated as well as the angle 16, to better optimize diffusion within the illuminated region 14, and to better reduce diffusion across the edge 19 (i.e. to better reduce spreading of light from one pixel 11 into a neighbouring pixel region 17 corresponding to a pixel 11 of lower illumination), e.g. in dependence on a local curvature of a contour of the edge as projected 19.

It will be noted that anisotropic blurring may be only required along edge features 13 in some applications. If so, blurring within the pixel regions 17 that are dashed, may not be desired. In any case, blurring of pixel regions 17 that are not illuminated, is unnecessary. It may still be useful to blur these pixel regions 17 to increase an ease of alignment of the blurring map 15 with the edge features 13, or to permit additional encoding of blurring maps for alignment with other images 10 to be encoded in a single blurring map 15.

While FIG. 2 shows a blurring map 15 with some generality, in some embodiments a simpler map consisting substantially of a same angle 16 uniformly spread across the whole plane of illumination is found to be satisfactorily useful if the projected image 20 is suitably regular.

The desired projected image 20 is provided by aligning the pixellated, high contrast image 10 with the blurring map 15. As such, the blur applied to the pixels 11, and together to edge features 13, result in high resolution, high contrast edges 16 in the projected image 18. In general, two approaches are possible for alignment: either the blurring map 15 is moved to match a prescribed image 10, or the blurring map 15 is fixed, and one or more images 10 are modified to optimize the projected image 20. The fewer degrees of freedom of the ABOE(s) 9, the heavier the reliance on optimizing the image 10. As precision mechanical movements are typically more expensive, time consuming, and less reliable in an uncontrolled environment than the scanning through images, especially when an automated program is used to analyze the projected image 20, this may be preferable.

EXAMPLE

Lower Cost System (Prophetic Example)

A Projector: Proxima ultra light×350 which contains a digital video interface card and a DMD chip. For best results, a colour wheel of the projector can be removed, as this provides a brightest illumination. A convex cylindrical lens with a focal length of 150 mm can be placed in front of the projector at 4 mm from the projection lens, parallel with the projection lens. An angle between the cylindrical lens' axis and the edges of the DMD mirrors is chosen, for example to be other than 0-2°, 88-92° or 178-180°, such as 8°. A procedure for cycling through illumination image instructions and evaluating the projected images until optimal images are identified is performed to calibrate the system. Thereafter images with linear (skew from the pixel axes) by the 8° will be blurred to provide lines with edges that have much higher contrast and resolution than can be produced with blurred projections of the same projector.

Higher Quality Projection System (Used to Produce All Experimental Evidence)

An optical module LED-OM for DMD (Discovery 1100/3000) light source, DMD Discovery D4000 0.7 XGA kit, and a convex cylindrical lens with a focal length of 150 mm (Edmund Optics) were obtained. Control electronics were coupled between the DMD chip and projector controller. The projector controller was coupled to a computer, with a driver for the projector controller. The light source was coupled to the DMD chip in a conventional manner. The projector lens and internal optics were assembled. The cylindrical lens was placed about 4 mm in front of the projection lens of the optical module, parallel with the projection lens.

For imaging and analysis of the projection, a c-cam fci-14000 monochromatic camera with a Carl Zeiss Makro-Planar 2/100 ZF-I lens were used.

Alignment of the cylindrical lens (ABOE) with respect to the image was performed by fixing the anisotropic blurring element to a stand substantially perpendicular to the projector beam, at the 8° angle with respect to the pixel array, and computing empirical feedback on various illumination patterns until an optimally aligned image was formed (i.e. when the blurring was at all points substantially perpendicular to the edges in the plane of illumination).

Figure 3:
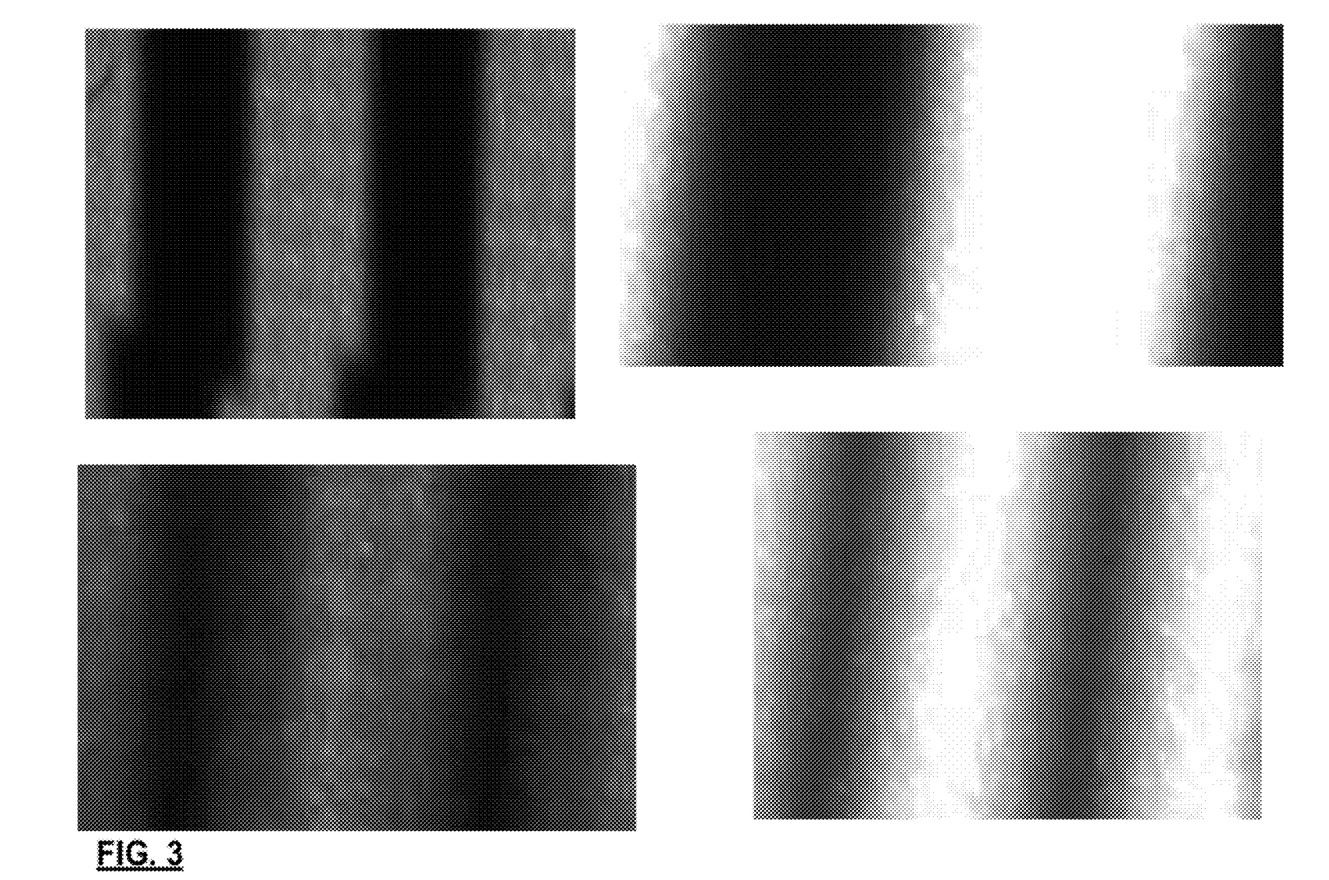
FIG. 3 schematically illustrates 4 projected images: two with binary (square) edge profiles, and 2 with sinusoidally varying edge profiles; and two using the anisotropically blurring maps, and two without.

FIG. 3 shows 4 photographs taken of flat smooth surfaces on which 4 images are projected. A same resolution on the camera was used for each image, but the images are enlarged to various degrees. The left hand photographs are taken without anisotropic blurring, and the right hand photographs are taken with anisotropic blurring. The difference in contrast is immediately striking. The top photographs are of binary projected images defining a square intensity profile (with the 8° in the vertical direction) whereas the bottom photographs approximate a sinusoidal function with a same period (about 4 pixels). The intentional reduction in illumination of the pixels by sinusoidal modulation reduces the contrast of the bottom photographs in comparison with the top photographs. For applications such as structured light (fringe) projection, it is desirable to use sinusoidal intensity edge profiles as shown here. Isotropic blurring (defocussing) of the photographs on the left lead to further loss in contrast.

It will be noted that the photographs that use anisotropic blurring, lead to a blurring where it is desired, and substantially no blurring of light pixels into regions of lower intended illumination. Intrapixel illumination defects and interpixel gaps are removed. A higher contrast, high resolution image is therefore produced, as demonstrated by the photographs. Furthermore, because of the blurring, higher quality sinusoidal patterns were produced of smaller period. Typically the spatial period is tied to the dimensions of 4 contiguous pixels of the projector array, however, in accordance with the invention, a sinusoidal pattern having a period as low as 2.5 pixels has been produced. Because of a loss of contrast of these higher frequency sinewave projection patterns, and because contrast is crucial to the present application, the illustrated examples of sinewaves have a period of 4 pixels.

Figure 4:
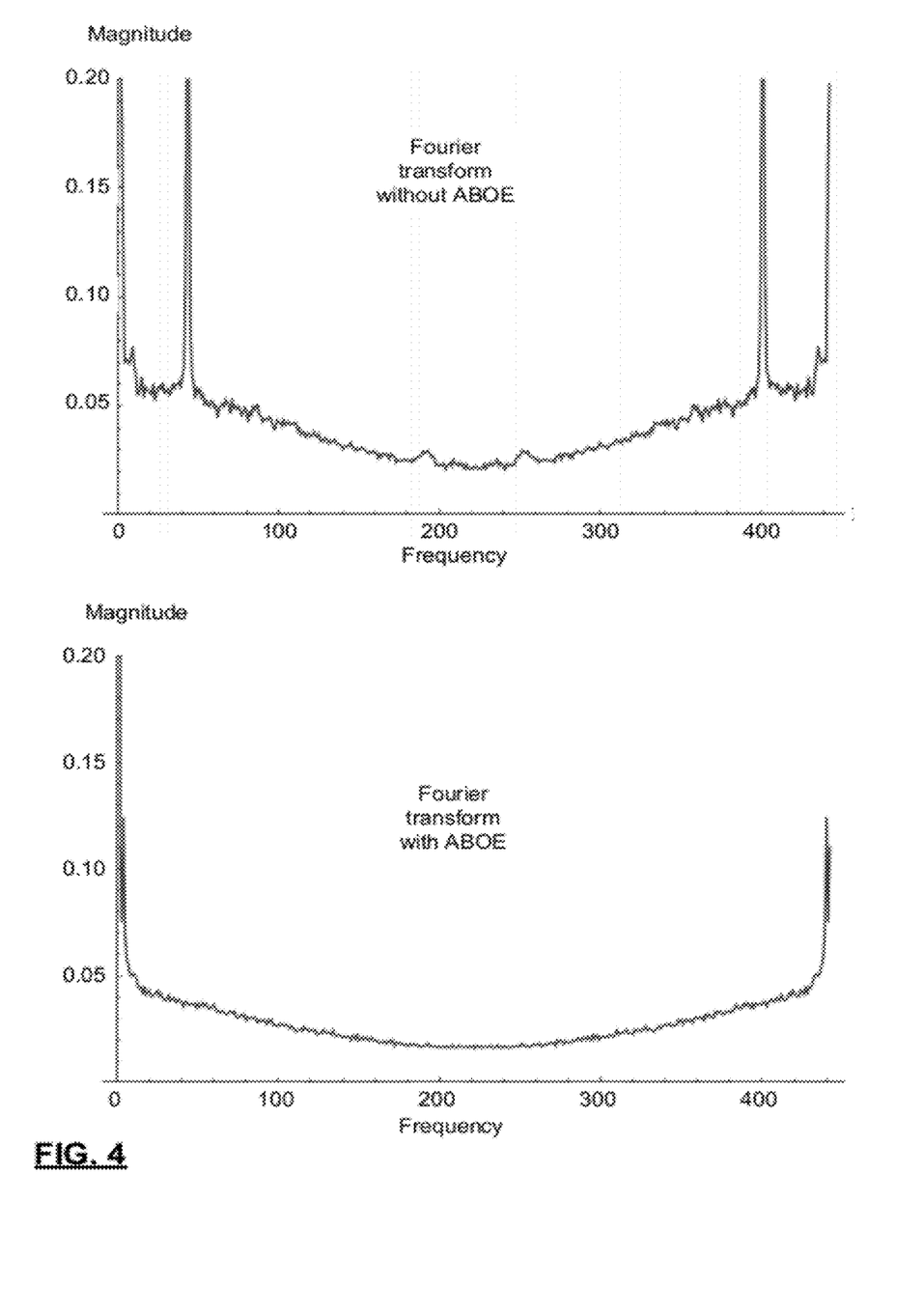
FIG. 4 plots frequency domain of projected images with and without the anisotropically blurring maps.

FIG. 4 graphs 1D frequency domain (fast Fourier transforms) of photographs shown on the bottom of FIG. 3 (i.e. the sinusoidally varying patterns). It will be noted that the strong peaks near 45 Hz and 400 Hz from the left hand side photograph (without ABOE) are strong peaks, and these are completely removed in the right hand side photograph (with ABOE). These peaks are attributed to interpixel gaps. Other frequency noise observed throughout the spectrum are attributable to shape variation of the sample and electronic noise of the camera. The noise floor of the "with ABOE" photograph is noticeably lower than it is in the "without ABOE" photograph.

Figure 5:
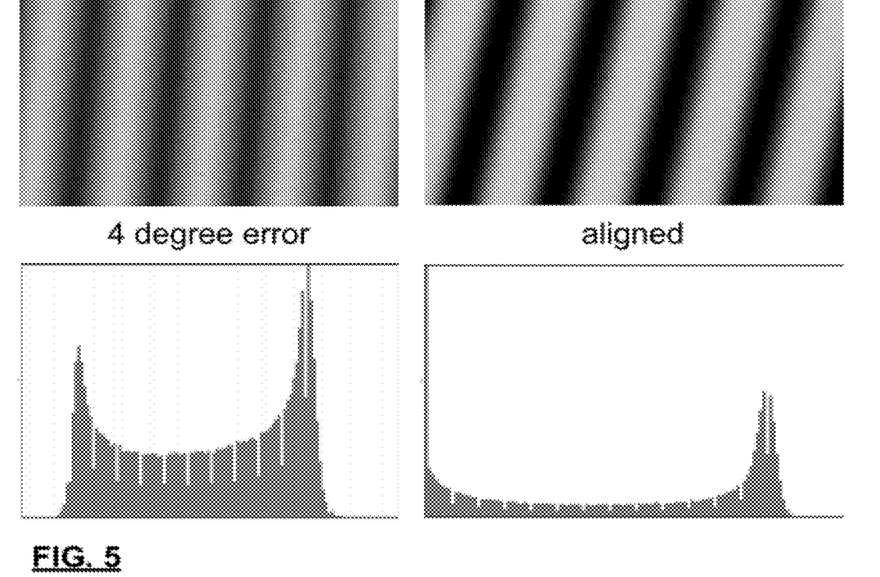
FIG. 5 shows the sensitivity of alignment of the blurring map with respect to the pixellated image with respect to the contrast.

FIG. 5 shows the importance of controlling blurring direction accordance with the present invention. While the prior art would blur completely indiscriminately (by defocusing) the present invention seeks to only blur as needed to remove the undesired effects. To demonstrate the sensitivity of alignment of the blurring map with the pixellated image, the projected image (photographed in the top right hand of FIG. 3) and reproduced at the top right of FIG. 5 is compared with exactly the same projector and ABOE angle, but with a skew angle of 4° of the pixellated image instead of the 8° required by the ABOE (photographed at top left). Histogram of the images, which indicate a number of camera pixels receiving respective illumination values that are ordered from brightest to darkest for the respective photographs bear out that better contrast, by far, is provided by the well aligned, right hand photograph.

Application to Metrology

The images shown in FIG. 3 bottom right was used to illuminate a surface, providing a structured light pattern on the surface also known in the art as "texture". Photographs of the surface were acquired using the camera. A fringe projection program was used for matching pixel illuminations of the projector with those of the camera, and to analyze the images to provide a map of the surface. Specifically the method taught in Applicant's copending U.S. application Ser. No. 12/453,765 (the entire contents of which are incorporated herein by reference) was used for segmentation and improved deconvolution in structured light systems.

Figure 6:
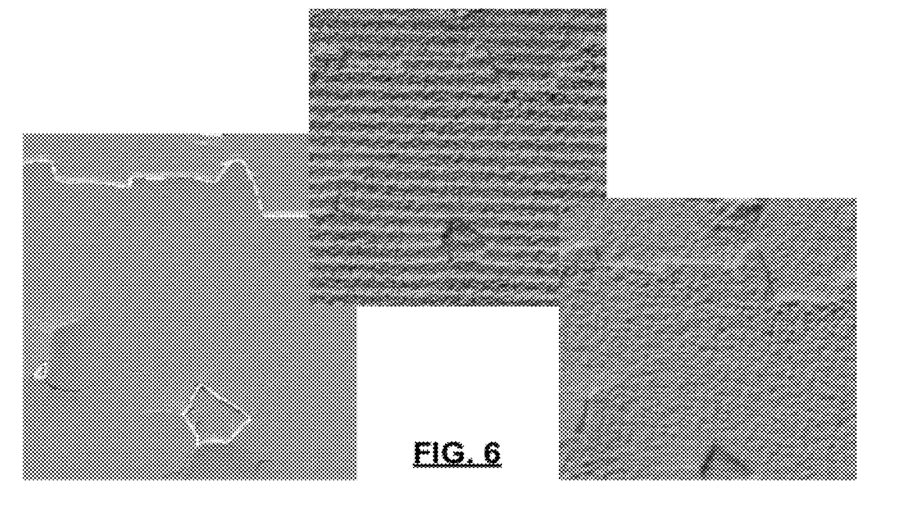
FIG. 6 shows a degree to which surface models acquired with the projected images are improved by the use of the anisotropically blurring maps.

FIG. 6 shows 3 surface 3D models derived by conventional phase shift processing of projected images on a surface, that were photographed with the camera, using a Nikon macro 55 mm lens. Specifically 8 sinewave images, each phase offset with respect to the 7 others were imaged. Phase ambiguity was resolved using 10 binary patterns, which form a hierarchy of binary partitions in one dimension (also tilted at 8°). All of the binary and sinewave projected images are produced using the same projector array and ABOE at a same angle, thus demonstrating that a whole family of projected images can be provided with a single blur map. For reference, the left hand surface model is produced by a Conoprobe interferometric technique. While the image is of excellent quality, it takes approximately 20 minutes to produce this model, because of the requirement to scan the sample arm of the interferometer across the surface. The second model is produced by illuminating the same surface with the image photographed in FIG. 3 at the bottom left, without an ABOE. The regular lines at the interpixel gap spacings are immediately obvious. The third model is the same as the second, but using the ABOE (bottom right FIG. 3). Feature definition and resolution are substantially improved by using the projected image with ABOE. The approximate time for acquisition is less than 15 s for an image about 40 times larger than shown, and the field of view (FOV) of the camera is one quarter the size of the projection. Thus the image could be further magnified.

The third model was compared with an equivalent model produced with the 4° misalignment between high contrast (top row of FIG. 3) projected images. The resulting model had estimated RMS error 4 times greater than that of the (aligned) third model.

The invention has been disclosed as a technique for generating a high definition projected image from a substantially lower resolution digital projector array. The technique involves selectively illuminating a connected set of pixels at the digital projector array, to produce a pixellated, high contrast edge feature, and applying an anisotropically blurring optical element positioned between a light source of the projector array and the projection for applying an anisotropic blur pattern to the at least one connected set of the pixels, to locally preferentially blur the pixels so that illuminated pixels are blurred only in a direction of equally or more strongly illuminated pixels. This may be tangentially, along a contour of the connected set of pixels that define the edge feature to the extent allowed by a pixellated, low resolution representation. Several images each having several or many edges can be produced using a same anisotropically blurring optical element. The same anisotropically blurring can alleviate interpixel gap effects and discretization of a projected images.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for projecting a special purpose image using a lower resolution digital projector array, the method comprising:
    choosing a pattern to be illuminated, the pattern having at least one high contrast edge feature that extends continuously across a plane of the illumination;
    applying an illumination pattern on the projector array to define a pixellated, high contrast approximation to the edge feature; and
    providing an anisotropically blurring optical element between an illumination source and the projection that blurs each pixel of a connected set of pixels of the illumination pattern more in directions of pixels of equal or greater illumination, and less in directions of pixels of lower illumination.

2. The method of claim 1 wherein choosing the pattern comprises choosing a pattern wherein each edge feature extends without end within the illumination plane.

3. The method of claim 1 wherein providing the anisotropically blurring optical element comprises anisotropically blurring each pixel of the connected set of pixels at substantially a same degree and at a fixed angle with respect to the projector array.

4. The method of claim 1 wherein providing the anisotropically blurring optical element comprises providing:
    a cylindrical lens;
    a plurality of linear strips, each with a respective cylindrical lens;
    a Fresnel lens;
    a diffraction medium bearing a pattern;
    a reflective surface bearing a pattern;
    a hologram; or
    an interferometric pattern.

5. A system for projecting an image with a lower resolution projector array, the system comprising:
    a digital projector array adapted to selectively illuminate at least one connected set of pixels to produce a pixellated, high contrast edge feature;
    an anisotropically blurring optical element positioned between a light source of the projector array and the projection, the anisotropically blurring optical element applying an anisotropic blur pattern to the at least one connected set of the pixels, to locally preferentially blur the pixels tangentially, along a contour of the connected set of pixels.

6. The system of claim 5 wherein:
    the digital projector array is adapted to produce a number of different images, each image having a respective set of at least one connected set of pixels.

7. The system of claim 5 wherein:
    the connected set has no beginning or end within an illumination plane, but may have a beginning and/or an end at a periphery of the illumination plane; or the blur pattern has a degree of blurring for a given pixel in the blur pattern that is higher if neighbouring pixels of the contour are more distant, or if at the given pixel the contour is the straightest.

8. The system of claim 5 wherein anisotropically blurring optical element comprises:
   a cylindrical lens;
   a plurality of linear strips, each with a respective cylindrical lens;
   a Fresnel lens;
   a diffraction medium bearing a pattern;
   a reflective surface bearing a pattern;
   a hologram; or
   an interferometric pattern.

9. The system of claim 5 wherein:
   the digital projector array is adapted to selectively illuminate an image comprising multiple connected sets of pixels, each defining a respective edge feature;
   the digital projector array is adapted to selectively illuminate any one of a set of images, each image comprising multiple connected sets of pixels, each connected set defining a respective edge feature; or
   the digital projector array is adapted to selectively illuminate any one of a set of images, each image comprising multiple connected sets of pixels, each connected set defining a respective edge feature, and one anisotropically blurring optical element with one anisotropic blur pattern preferentially blurs the pixels tangentially, along each contour of each of the connected sets of pixels of each of the images.

10. A kit comprising:
    an anisotropically blurring optical element suitable for applying an anisotropic blur pattern to an incident plane wave, the blur pattern preferentially blurring local elements such that blurring follows a substantially continuous, connected polyline; and
    instructions for: positioning the optical element between a light source of the projector array and a projection; and aligning the optical element with respect to the projector array, whereby one or more patterns of illumination from the digital projector array will emit a pixellated, high contrast edge feature that is anisotropically blurred by the optical element to project an image including a high contrast, high resolution edge feature.

11. The kit of claim 10 further comprising one or more of:
    a digital camera for imaging the projected image;
    a software program for receiving a digital image of the projected image, and compute a surface topography of a surface on which the image was projected;
    a mounting for positioning the optical element;
    a software program for receiving a digital image of the projected image, and controlling an alignment of the optical element via a mounting;
    the digital projector array;
    a software program for receiving a digital image of the projected image, controlling a pattern of illumination of the digital projector array, and/or controlling an alignment of the optical element via a mounting; and
    a software program for receiving a digital image of the projected image on a surface, and matching camera pixel information with projection pixel illuminations.

12. The kit of claim 10 wherein the optical element comprises:
    a cylindrical lens;
    a plurality of linear strips, each with a respective cylindrical lens;
    a Fresnel lens;
    a diffraction medium bearing a pattern;
    a reflective surface bearing a pattern;
    a hologram; or
    an interferometric pattern.

13. The method of claim 2 wherein choosing the pattern further comprises choosing a pattern where one or more edge features extend between two ends, both of which ends lie on a periphery of the illumination plane.

14. The method of claim 13 wherein choosing a pattern where one or more edge features extend between two ends comprises choosing a pattern with a plurality of edge features that extend without intersecting with any other edge feature, within the illumination plane, and wherein providing the anisotropically blurring optical element comprises: providing a blurring element for each edge feature that is independently movable; and moving each of the blurring elements and/or modifying the illuminated pixel pattern, for alignment between respective blurring elements and edge features.

15. The method of claim 14 wherein the plurality of edge features are arranged in parallel within the illumination plane.

16. The method of claim 1 wherein choosing a pattern comprises:
    choosing a pattern wherein one edge feature is a straight line that extends without ending, or intersecting with any other edge feature, within the illumination plane;
    choosing a pattern wherein one edge feature is a straight line that extends without ending, or intersecting with any other edge feature, within the illumination plane, the line being off axis of the projection array to provide a jagged, pixellated, high contrast approximation;
    choosing a pattern wherein one edge feature is a curve that extends without ending, or intersecting with other high contrast edges, within the illumination plane to provide a jagged, pixellated, high contrast approximation;
    choosing a pattern wherein one edge feature is a curve that extends without end within the illumination plane, wherein a magnitude of the curvature is constant;
    choosing a pattern having a plurality of edge features wherein each edge feature is a straight line that extends without end within the illumination plane;
    choosing a pattern having a plurality of edge features, each of which extending without end within the illumination plane, wherein each pair of edge features is at a fixed separation in a given direction, and thus they have parallel tangents at each point;
    choosing a pattern having a plurality of edge features, each of which is a line extending without end within the illumination plane, wherein each pair of high contrast edges is parallel; or
    choosing a pattern wherein each edge feature extends without end within the illumination plane, the edge having a continuous and uniform intensity profile in a normal direction perpendicular to the local tangent of the edge.

17. The method of claim 1 wherein choosing a pattern comprises choosing a pattern having a plurality of edge features, each of which extending without end within the illumination plane, wherein each pair of edge features is at a fixed separation along a first direction, and thus they have parallel tangents at each corresponding point, and wherein providing the anisotropically blurring optical element comprises: providing a blurring element that has a 1 dimensional pattern of anisotropic blurring directions to match the tangent when aligned with the first direction.

18. The method of claim 1 wherein choosing a pattern comprises:

choosing a pattern wherein the edge feature has a bright side and a dark side, and wherein providing the anisotropically blurring optical element comprises: providing a blurring element that blurs the pixellated, high contrast, jagged approximation of the edge feature, and furthermore blurs a bright side of the pattern to remove interpixel gaps within the vicinity of the edge feature, while minimally decreasing contrast of the image;

choosing a pattern wherein the edge feature has a bright side that gradually and smoothly transitions to a dark side, and wherein rotation of the image and the anisotropically blurring optical element with respect to the digital projector array is used to vary an extent of the transition;

choosing a pattern wherein the edge feature has a bright side that gradually and smoothly transitions to a dark side, and wherein rotation of the image and the anisotropically blurring optical element with respect to the digital projector array, and a local degree of blurring of the anisotropically blurring optical element are used to vary an extent of the transition; or choosing a pattern wherein the edge feature has a bright side that gradually and smoothly transitions to a dark side, and wherein an extent of the transition is controlled by: rotation of the image and the anisotropically blurring optical element with respect to the digital projector array, a local degree of blurring of the anisotropically blurring optical element at respective locations; and selecting a local curvature of the edge feature.

19. The method of claim 3 wherein;

the connected set of pixels include a chain of pixels that extends without end within the plane of illumination;

each connected set of pixels includes a chain of pixels that extends without end within the plane of illumination;

a plurality of connected sets of pixels are anisotropically blurred, and each connected set of pixels includes a chain of pixels that extends without end within the plane of illumination without overlapping any other chain of pixels;

a plurality of connected sets of pixels are anisotropically blurred, and each connected set of pixels includes a chain of pixels that extends without end within the plane of illumination, the chains being parallel; or a plurality of connected sets of pixels are anisotropically blurred, and each connected set of pixels includes a chain of pixels that extends without end within the plane of illumination, the chains being parallel lines.

20. The method of claim 1 wherein providing the anisotropically blurring optical element comprises anisotropically blurring in a direction tangential to the edge feature, and substantially not blurring in a direction normal to the edge feature.

* * * * *